United States Patent [19]

Campbell

[11] Patent Number: 5,656,999

[45] Date of Patent: Aug. 12, 1997

[54] FLUID LEAK CONTAINMENT SYSTEM

[76] Inventor: David C. Campbell, 1129 Edenbridge Way, Knoxville, Tenn. 37923

[21] Appl. No.: 432,885

[22] Filed: May 2, 1995

[51] Int. Cl.$^6$ ........................................ G08B 21/00
[52] U.S. Cl. ........................ 340/605; 340/603; 340/616; 73/40; 364/509
[58] Field of Search ........................ 340/603, 604, 340/605, 616; 73/40, 49.2, 49.1; 364/509, 550

[56] References Cited

U.S. PATENT DOCUMENTS

| | | | |
|---|---|---|---|
| 3,069,671 | 12/1962 | Taylor | 340/616 |
| 3,633,341 | 1/1972 | Langlois | 96/190 |
| 3,763,960 | 10/1973 | John | 184/6.13 |
| 4,324,268 | 4/1982 | Jacobson | 340/620 |
| 4,852,054 | 7/1989 | Mastandrea | 340/605 |
| 5,172,584 | 12/1992 | Thomas | 73/49.2 |
| 5,345,224 | 9/1994 | Brown | 340/605 |
| 5,357,241 | 10/1994 | Welch, Jr. et al. | 340/603 |
| 5,363,093 | 11/1994 | Williams et al. | 340/605 |

*Primary Examiner*—Jeffery Hofsass
*Assistant Examiner*—Davetta C. Woods

[57] ABSTRACT

A system for use with an electric power transmission device having oil filtration apparatus including an oil filtration unit arranged external to the electric power transmission device, a motor-driven circulation pump and at least one conduit extending between the oil filtration unit and the electric power transmission device utilizes a secondary containment enclosure for enclosing the oil filtration unit, pump and conduits. The secondary containment enclosure includes a sump reservoir to which oil gravitates upon leakage of oil from the oil filtration apparatus enclosed by the secondary containment volume, and there is associated with the sump reservoir a signal-transmitting device for transmitting a signal in response to the accumulation of oil in the sump reservoir for actuating an alarm, isolating the source of insulating oil from the circulation system and disconnecting power to the circulating pump. The system thus prevents the loss of insulating oil and environmental contamination by leaks or ruptures in the oil circulation conduits.

16 Claims, 4 Drawing Sheets

FLUID LEAK CONTAINMENT SYSTEM

BACKGROUND OF THE INVENTION

The present invention relates generally to the containing of fluid leaks and relates, more particularly, to the means with which fluid leaks are contained.

One application with which this invention is concerned involves electric power transmission devices, such as transformers and switch gear, which are commonly immersed in a specially- compounded oil having dielectric properties for purposes of insulation, isolation and cooling. On occasion, these devices generate extremely high operating temperatures during electrical arcing which, in turn, decompose small portions of the oil into elemental carbon. This elemental carbon remains suspended within the oil as suspended graphite particles.

Additionally, the chemical nature of the oil is hydrophilic. Any atmospherically carried water coming into surface contact with the oil is adsorbed and entrained.

Both water droplets and graphite particles are undesirable contaminants of the oil and should be removed, either periodically or continuously. Fortunately, both contaminants are effectively removed by relatively simple, depth wound unsized paper reel filters. A traditional installation often will connect a transformer oil cavity by external plumbing conduits to adjacently housed pump and filter units. Circulation around the conduit loop is driven by the pump motor which is controlled by cycle timers and filter pressure differential monitoring switches. Circulation may be continuous or intermittent, depending on the type of transformer or the service to which it is applied.

Upon the event of the loss, i.e. substantially total loss, of the insulating oil from the electric power transmission device, the heat generated during device operation will likely lead to failure of the device, and such failures are likely to be costly.

Another consequence of the loss of such oil from the electric power device relates to the environmentally hazardous nature of the chemical composition of the oil. Consequently, these oils are heavily regulated and monitored. Affected site clean-ups due to leaks and spills are extremely expensive and may subject to the responsible manager to fines and other penalties. Accordingly, great care is normally exercised in handling these fluids and reasonable precautions are taken to prevent leaks from the external filter circulation system. Nevertheless, leaks can and do occur.

Accordingly, it is an object of the present invention to provide a new and improved secondary containment means for fluid circulation systems.

Another object of the present invention to provide such means which is particularly well-suited for use in connection with applications, such as electrical power transmission devices, in which fluid loss from a circulation system can result in damage to the system components or to the environment.

Still another object of the present invention is to equip such means with an alarm system for alerting personnel of a leak in the fluid circulation system.

A further object of the present invention is to equip such means with a secondary conduit system for enclosing conduits within which a fluid is circulated.

A still further object of the present invention is to provide such means which is relatively uncomplicated to construct and effective in operation.

SUMMARY OF THE INVENTION

This invention resides in a secondary containment system for use with an enclosure within which fluid is contained and wherein the enclosure has an external surface.

The system includes containment means which provides an internal cavity for enclosing at least a portion of the external surface of the enclosure within which fluid is contained. The containment means includes a sump reservoir associated with the internal cavity so that upon leakage of the fluid through the external surface of the enclosure, the fluid flows to the sump reservoir. The system also includes means associated with the sump reservoir for transmitting a signal in response to the accumulation of fluid in the sump reservoir.

DETAILED DESCRIPTION OF THE ILLUSTRATED EMBODIMENT

Figure 1:
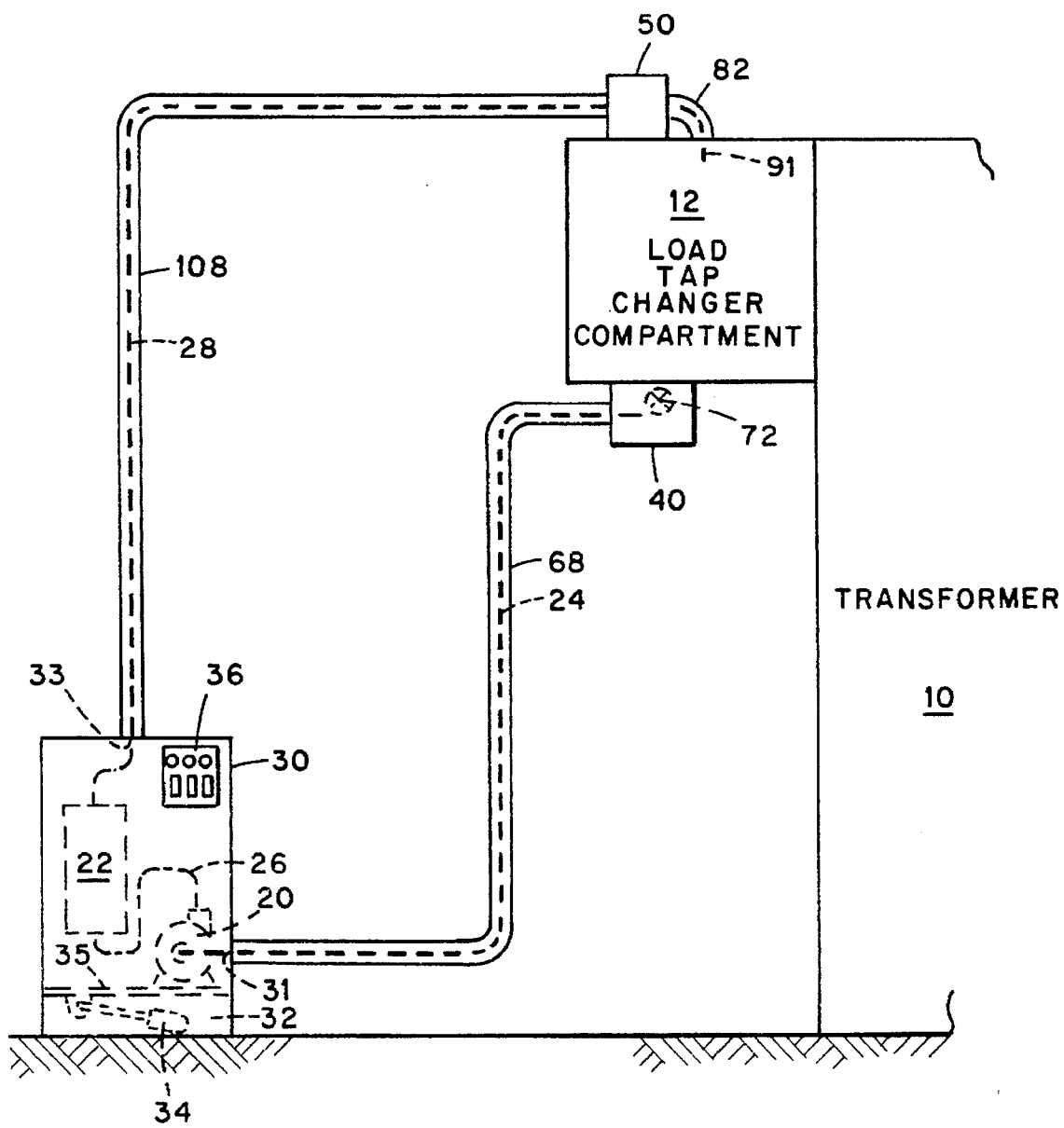
FIG. 1 is view illustrating schematically a fluid circulation system with which an embodiment of the present invention is employed.

Turning now to the drawings, there is shown in FIG. 1 a fluid circulation circuit of an electric power transmission device with which an embodiment of the present invention is employed. More specifically, the illustrated device is the load tap changer 12 of an electric power transformer 10. Typically, such a power transformer has a height of about ten to fourteen feet as measured from ground level and has a nominal diameter (or rectangular side dimension) of about three to six feet across. The transformer 10 and load tap changer 12 of FIG. 1 are merely representative of many types of electric power transmission devices that further include breakers, closures, reclosures and switches.

Each transformer casement is usually externally finned for heat dissipation and sealed to prevent loss and leakage of internal fluids which immerse a plurality of core and winding assemblies. The internal fluid is an oil substance, not necessarily petroleum based, but moderately viscous and highly dielectric to insulate the several winding sets from arcing between themselves and the transformer case. Localized heating of the oil stimulates internal convective circulation which transfers the heat generated by electrical transform losses to the outer case for conduction therethrough to the exterior dissipation fins. Pumps and radiators may also be used to cool the insulating oil.

The load tap changer is a mechanical switching array by which the transformer output is regulated for line demand. The electrical arcing usually incident to the closure and opening of charged electrical contacts is a momentary point source of extreme heat if not vacuum isolated. Such extreme heat in the presence of the insulating oil generates particulate graphite from a dissociation of the oil. Such particulate graphite becomes a contaminant in the oil body and contributes to a reduction of the dielectric property of the oil. For reasons which amount to a greater propensity for contaminant generation, a load tap changer oil cavity of 300 to 800 gallons capacity is frequently isolated from the oil cavity respective to the transformer winding case. Breakers, closures, reclosures and switch boxes may encase 50 gallons to 200 gallons of dielectric insulating oil.

Typically, the transformer or load tap changer insulating oil is circulated by a pump 20 through a filtration unit 22.

Section conduit 24 provides a fluid flow channel between the bottom of the load tap changer oil cavity (FIG. 4) and the pump 20 suction connection. Pump discharge conduit 26 connects to the inlet of filter 22. Return conduit 28 carries the oil circulation flow loop back to load tap changer (FIG. 3) 12.

The pump 20 and its associated electric motor 21 (FIG. 2), the filter 22 and the related electric control panel 36 are housed within a cabinet enclosure 30 which is generally located closely adjacent the transfer load changer 12 and elevationally below the conduit 24 and 28 connection points with the load tap changer.

Also within the enclosure 30, preferably at an elevational point below the enclosure penetration points 31 and 33, is a normally dry oil sump reservoir 32. A perforated cabinet floor 35 preferably, but not necessarily, separates the upper volume of the cabinet enclosure from the lower reservoir volume 32. Fluid presence within the reservoir 32 is monitored by a level sensor 34 shown to be a float switch. It should be understood that no particular volume of oil is required in reservoir 32 for effecting a signal from the sensor 34. Accordingly, any of numerous sensor types may be used equivalently in this application. For example, a dielectric sensor which measures the dielectric strength of a fluid covering the sensor surface would signal not only the presence of the insulation oil when air over the sensor surface is displaced but also the dielectric condition of the oil contacting the sensor surface. Other sensor types that may be used are ultrasonic sensors that respond to volumetric changes within the reservoir and special sensors that respond to the light color reflected from the reservoir floor.

At each of the load tap changer case penetration points for the primary circulation conduits 24 and 28, connector housings 40 and 50 are provided. Each of housings 40 and 50 are of different style suited for a particular installation circumstance. Depending upon the mix of these installation circumstances, either housing type could be used at both locations or other functionally equivalent secondary containment housings may be used.

Figure 4:
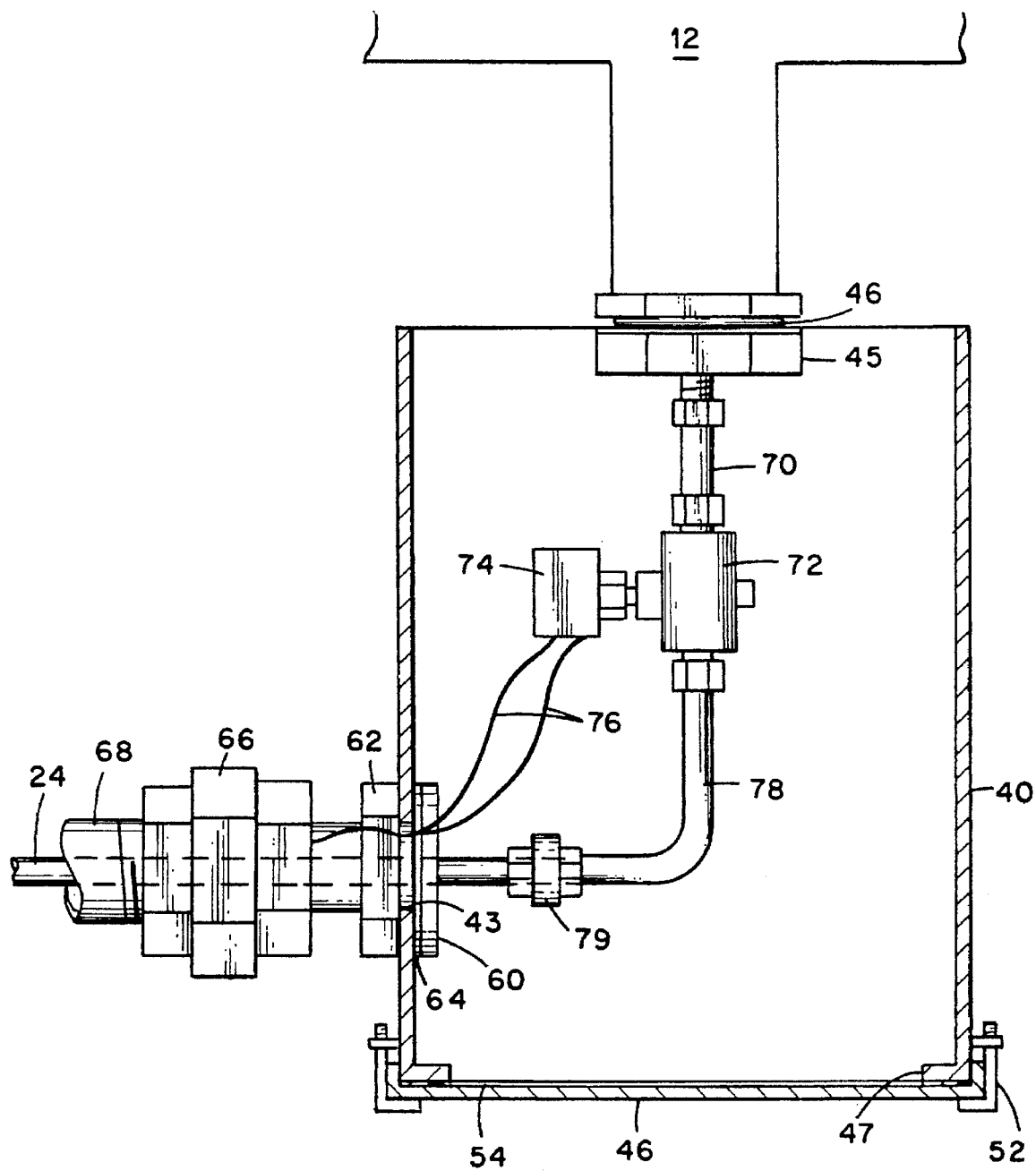
FIG. 4 is a view similar to that of FIG. 3 of another fragment of the FIG. 1 embodiment.

In the example of the penetration housing 40 for the suction conduit 24 shown best by FIG. 4, the housing body is a rectangular enclosure, or housing 40, that is secured tightly against the load tap changer case 12 by the force of a threaded bushing 45 screwed into tap changer housing 12 to compress an O-ring 46 against the exterior face of housing 12. At the other or bottom end of the rectangular enclosure 40, the enclosure 40 is provided by an end port 47. A cover 46 which is secured by machine screws 52 against a gasket 54 provides resealable tool access to enclosure 40.

An aperture 43 in the wall of the enclosure 40 receives a flanged bulkhead nipple 60 which is drawn by a compression nut 62 against a gasket 64. The exterior threaded end of the bulkhead nipple is provided with half of a pipe union 66. The other half of the pipe union 66 is threaded upon a pipe sleeve 68 that completely encloses the pump suction conduit continuously to the cabinet enclosure 30.

The cover 46 provides a resealable tool access to the interior of the enclosure 40 while in sealed position against the load tap changer case 12. Within the enclosure 40, oil flow from the load tap changer through the pipe stub 70 is controlled by an electric solenoid valve 72 energized by winding 74 and conductors 76. A 90° elbow sub 78 connects the valve 72 to the conduit 24 with a tubing union 79.

Figure 3:
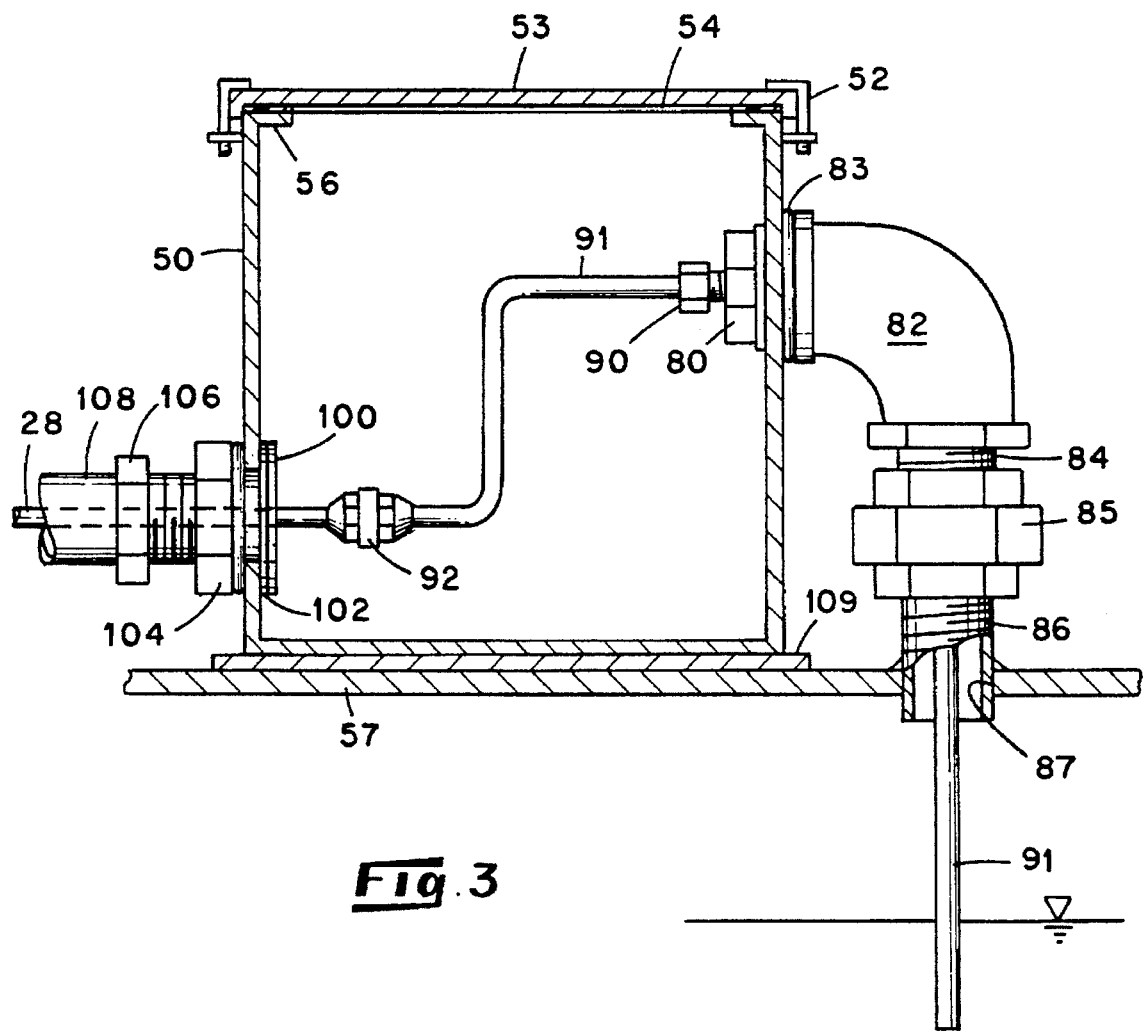
FIG. 3 is an elevational view, shown partially in section, of a fragment of the FIG. 1 embodiment.

Penetration housing 50 of FIG. 3 may have a cylindrical or rectangular sectional form that is secured by a threaded bushing 80 used to compress a gasket or O-ring 83 against a 90° ell 82. Access to the interior of the housing 50 is provided through an end port 56. A cover 53 secured by machine screws 52 against a gasket 54 provides resealable tool access to the interior of the housing 50. A sheet rubber pad 109 is used to insulate enclosure 50 from tap changer case 57.

Through one aperture in the wall of housing 50 is a threaded bushing 80 screwed into a 90° ell 82 to compress a gasket or O-ring 83 against the exterior face of housing 50. A nipple 84 connects the 90° ell to half of a pipe union 85. The other half of the union 85 is threaded upon a stub 86 welded into an aperture 87 in the load tap chamber casing. A compression nut 90 threaded into the face of bushing 80 seals and secures a subsection of tubing 91 within the 90° ell 82. An extended tail of the subsection 91 extends through the stub nipple 86 into the load tap changer oil cavity. Within the interior of the housing 50, the subsection 91 is flow connected by union 92 to a terminal end of return conduit 28.

A second aperture through the wall of housing 50 is sealed by a flanged bulkhead nipple 100 compressed against a gasket 102 by a nut 104. The threaded outer end of the nipple 100 receives half of a union 106. The other half of the union 106 is threaded upon a pipe sleeve 108 that encloses a fluid drain channel around the return conduit 28 between the connector housing 50 and the cabinet 30.

Figure 2:
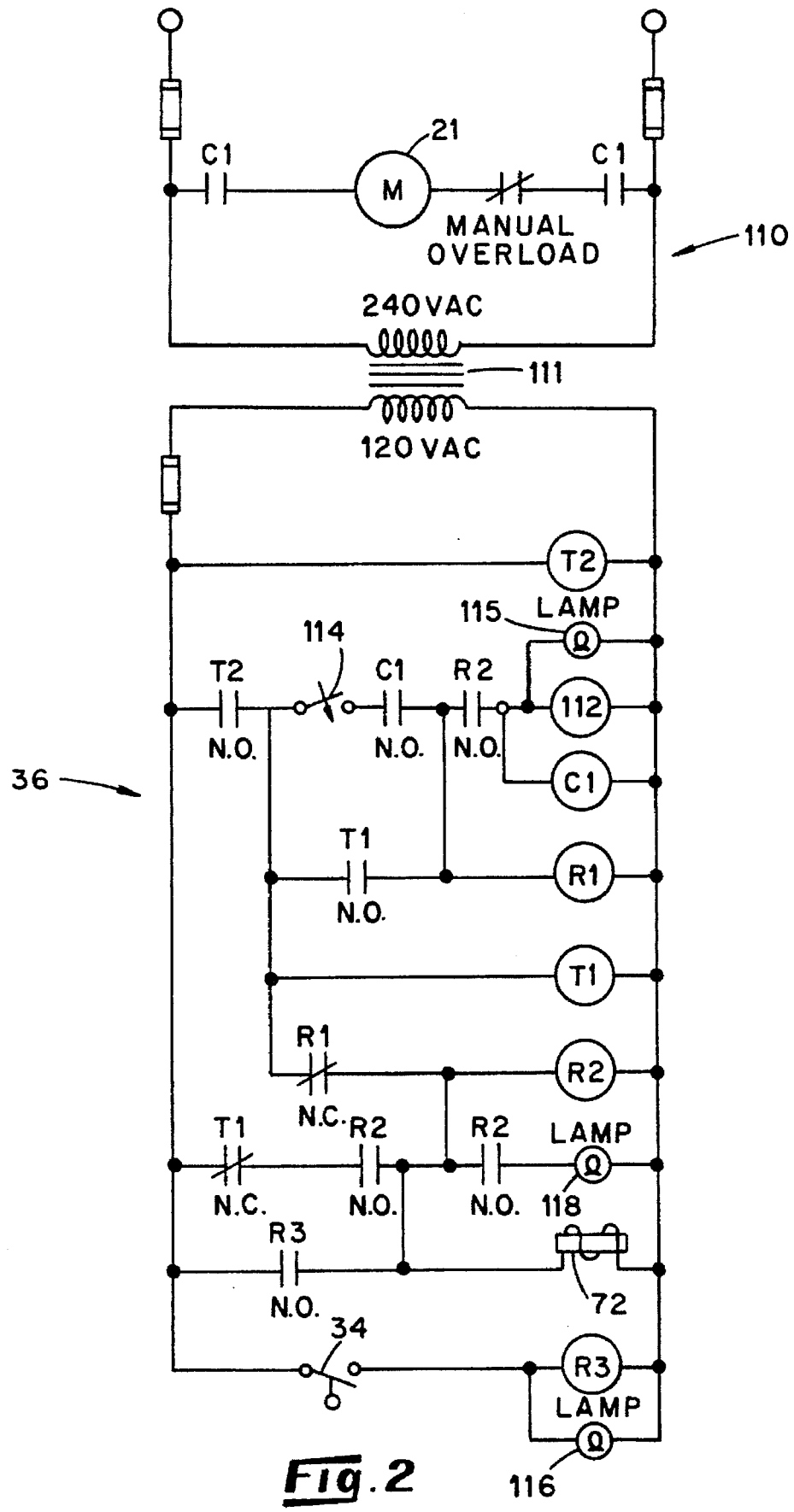
FIG. 2 is an electrical control schematic of the embodiment of the invention.

The pump motor and alarm control shown schematically in FIG. 2 includes a fused, 240 VAC power circuit 110 to energize the pump motor 21 and a voltage reduction transformer 111. On the low voltage side of the transformer 111, is a motor starting control relay C1 which operates to close the power circuit switches C1 and the 120 V circuit switch C1. An operation cycle control timer T2 operates to close the normally open subcircuit switch T2 to energize other control functions in coordination with the load tap changer operation. Load element 112 is a power meter for system management and lamp 115 provides a remote indication of normal motor 21 operation.

Switch 114 is a pressure differential control switch responsive to the pressure drop of pumped insulating oil across the filter unit 22. The control elements of this switch are adjusted to monitor a pressure differential range above a lower threshold and below an upper threshold. When pressure falls below the lower threshold as in the case of circuit conduit rupture or pump malfunction, the pump motor is disconnected from its energy source. Similarly, when the filter unit 22 is sufficiently loaded to cause the pressure differential across the unit to exceed the upper threshold limit, the pump motor power is disconnected.

An alternative embodiment of the invention may provide an electric clutch connection between the pump 20 and motor 21 whereby the motor runs continuously to drive other units of equipment and a mechanical drive connection between the motor and pump is disengaged.

In the event of leakage from the primary circulation circuit, whether by conduit rupture or faulty connector seal, fluid lost from the primary circuit will flow into the secondary containment volume within the housing 40 and 50, the cabinet 30 and the sleeve conduits 68 and 108. The pump and filter cabinet 30 is positioned elevationally below the load tap changer and the related connector housings 40 and 50. Consequently, significant fluid leakage from the primary circuit will eventually flow by gravity drive into the cabinet sump reservoir 32 thereby activating a signal from the fluid sensor switch 34.

When the fluid sensor 34 in the cabinet reservoir 32 detects the presence of oil in the reservoir due to leakage in the primary circulation circuit, switch 34 will close, energize the relay coil R3 and illuminate the associated lamp 116. With the energization of relay winding R3, switch R3 closes to energize the closure of solenoid valve 72 thereby preventing the drainage of fluid in the primary circuit from the load tap changer cavity. Relay winding R3 might also be employed to actuate external alarms or other systems as a consequence of the fluid sensor 34 signal.

When the valve 72 in the pump suction conduit 24 closes, a continued attempt of the motor 21 to operate pump 20 effects an operation of the pressure differential switch 114 and the general emergency shut down circuitry of relays R1, R2 and the alarm represented by lamp 118. All operating elements of the unit thereafter shut down and a general alarm is transmitted to the remote control center. To start the pump 20 again, reset protocol must be followed.

Although a preferred embodiment of the invention elevationally positions the sump volume 32 and fluid sensor 34 below the load tap changer connection housings, those of ordinary skill may reverse this alignment and position the pump higher than either of the connector housings. Such may be the case for circulation of insulation oil from the transformer 10 case cavity and the desirability of placing the pump suction housing 40 near the transformer case bottom. Such an elevational reversal of the invention components may be readily accommodated by positioning the fluid sensor 34 within the lowest connector housing or wherever the lowest gravity flow position is in the circulation system.

It also should be noted that more than one fluid sensor 34 may be employed by the invention. For example, parallel connected fluid sensors may also be positioned in both of the connector housings 40 and 50.

It will be understood that numerous modifications and substitutions can be had to the aforedescribed embodiment without departing from the spirit of the invention. Accordingly, the aforedescribed embodiment is intended for the purpose of illustration and not as limitation.

I claim:

1. A secondary containment system for use with an enclosure within which fluid is contained and wherein the enclosure has an external surface and includes a first conduit through which fluid is routed, the system comprising:

containment means providing an internal cavity for enclosing at least a portion of the external surface of the enclosure within which fluid is contained and including a second conduit positionable about so as to encompass the first conduit through which fluid is routed so that the containment means prevents flow communication between said portion of the external surface and the surrounding environment and between the first conduit and the surrounding environment;

the containment means including a sump reservoir associated with and in flow communication with the internal cavity so that upon leakage of the fluid through the external surface of the enclosure or from the first conduit, the fluid flows to the sump reservoir, and the sump reservoir is sized to hold a substantial portion of the volume of fluid being routed through the first conduit;

means associated with the sump reservoir for transmitting a signal in response to the accumulation of fluid in the sump reservoir.

2. The system as defined in claim 1 wherein fluid is circulated through the first conduit by means of a pump, and the system further includes means for shutting down the pump upon the accumulation of fluid in the sump reservoir.

3. The system as defined in claim 1 wherein fluid is circulated through the first conduit, and the system further includes means for interrupting the flow of fluid through the first conduit upon the accumulation of fluid in the sump reservoir.

4. The system as defined in claim 1 wherein the signal actuates an alarm system.

5. A system for use with a fluid circulation system having a motor driven circulation pump and fluid conduits through which the fluid is circulated, said system comprising:

means providing a secondary containment volume enclosing at least a portion of the fluid circulation system and including containment conduits wherein each containment conduit is positionable about so as to encompass a corresponding fluid conduit through which the fluid is circulated so that the secondary containment volume prevents flow communication between said portion of the external surface and the surrounding environment and between each fluid conduit and the surrounding environment;

the secondary containment volume including a sump reservoir to which fluid gravitates upon leakage of the fluid from the portion of the fluid circulation system enclosed by the secondary containment volume or from any of the fluid conduits, and the sump reservoir is sized to hold a substantial portion of the volume of fluid being circulated through the fluid conduits; and means associated with the sump reservoir for transmitting a signal in response to the accumulation of fluid in the sump reservoir.

6. The system as defined in claim 5 wherein the fluid circulation system is an oil filtration system associated with an electric power transmission device.

7. A system for use with an electric power transmission device having oil filtration apparatus including an oil filtration unit arranged external to the electric power transmission device, a motor-driven circulation pump and at least one oil conduit extending between the oil filtration unit and the electric power transmission device through which oil is conducted between the oil filtration unit and the electric power transmission device, the system comprising:

means providing a secondary containment volume for enclosing the oil filtration unit, pump and conduits so that the secondary containment volume-providing means prevents flow communication between each of the oil filtration unit, pump and the at least one oil conduit and the surrounding environment;

the secondary containment volume including a containment conduit which is positionable about so as to encompass the at least one oil conduit and including a sump reservoir to which oil gravitates upon leakage of oil from the oil filtration apparatus enclosed by the secondary containment volume, and the sump reservoir is sized to hold a substantial portion of the volume of fluid being circulated through the at least one conduit; and means associated with the sump reservoir for transmitting a signal in response to the accumulation of oil in the sump reservoir.

8. The system as defined in claim 7 wherein the oil filtration apparatus includes a plurality of oil conduits through which oil is conducted between the oil filtration unit and the electric power transmission device, and the volume-providing means includes a containment conduit positionable about so as to encompass a corresponding conduit of the oil filtration apparatus.

9. The system as defined in claim 7 further including means for shutting down the pump upon the accumulation of oil in the sump reservoir.

10. The system as defined in claim 7 further including means for interrupting the flow of oil through the at least one conduit of the oil filtration apparatus upon the accumulation of oil in the sump reservoir.

11. The system as defined in claim 10 wherein the interrupting means includes a valve.

12. The system as defined in claim 7 wherein the signal actuates an alarm system.

13. The system as defined in claim 7 wherein the oil filtration unit, pump and the sump reservoir are enclosed within a single cabinet.

14. The system as defined in claim 7 further including an internally accessible housing supported about and encompassing a portion of the at least one conduit of the oil filtration apparatus and situated adjacent the electric power transmission device for providing access to the portion of the conduit encompassed by the housing.

15. The system as defined in claim 14 wherein the housing is attached to so as to be supportedly secured in position adjacent the electric power transmission device by way of the conduit which includes the conduit portion encompassed by the housing so that the housing is not directly attached to the electric power transmission device.

16. In combination with an oil filtration apparatus for use with an electric power transmission device wherein the oil filtration apparatus includes an oil filtration unit arranged external to the electric power transmission device and a motor-driven circulation pump and at least one conduit extending between the oil filtration unit and the electric power transmission device through which oil is circulated between the oil filtration unit and the electric power transmission device by way of the circulation pump, a secondary containment system comprising:

means providing an internal cavity for enclosing the oil filtration unit, pump and conduits so that the enclosing means prevents flow communication between the oil filtration unit, pump and the at least one conduit and the surrounding environment;

the cavity-providing means including a containment conduit which is positioned about so as to encompass the at least one conduit and further including a sump reservoir associated with the internal cavity so that upon leakage of the oil from the oil filtration apparatus enclosed by the internal cavity, the oil flows to the sump reservoir, and the sump reservoir is sized to hold a substantial portion of the volume of fluid being circulated through the at least one conduit; and means associated with the sump reservoir for transmitting a signal in response to the accumulation of oil in the sump reservoir.

* * * * *